Oct. 22, 1935.　　　G. A. SALZGEBER　　　2,018,536
COMPASS
Filed Dec. 11, 1930　　　2 Sheets-Sheet 1

Inventor.
Gustave A. Salzgeber
by Heard Smith & Tennant
Attys.

Oct. 22, 1935.  G. A. SALZGEBER  2,018,536
COMPASS
Filed Dec. 11, 1930  2 Sheets-Sheet 2

Inventor.
Gustave A. Salzgeber
by Beard Smith & Tennant.
Attys.

Patented Oct. 22, 1935

2,018,536

UNITED STATES PATENT OFFICE 2,018,536

COMPASS

Gustave A. Salzgeber, Dorchester, Mass.

Application December 11, 1930, Serial No. 501,504

10 Claims. (Cl. 33—223)

This invention relates to a compass and particularly to the type of compass in which the compass is cylindrical in shape and in which the side walls of the cylinder are of glass.

One of the objects of the invention is to provide a compass of this type with novel means for clamping the top and bottom of the compass bowl to the cylindrical side walls.

Another object of the invention is to provide a compass of this type with novel means for illuminating the compass card so that it can be readily read in the dark.

A still further object of the invention is to provide a compass of this type in which the bottom of the compass bowl is of glass and which is provided with novel means for attaching the expansion chamber to the bowl.

A further object of the invention is to provide a novel compass of this type in which the cylindrical side wall of glass is so made that it has magnifying properties thereby making it easier to read the compass from the side. A further object of the invention is to provide a novel mounting for the compass bowl which absorbs lateral vibration, i. e., vibration in a direction transverse to the compass axis, while preventing movement of the compass bowl vertically or in the general direction of said axis relative to its support.

Other objects of the invention are to improve generally compasses in the particulars which will be more fully hereinafter set forth.

In order to give an understanding of the invention I have illustrated in the drawings a selected embodiment thereof which will now be described after which the novel features will be pointed out in the appended claims.

Figure 1:
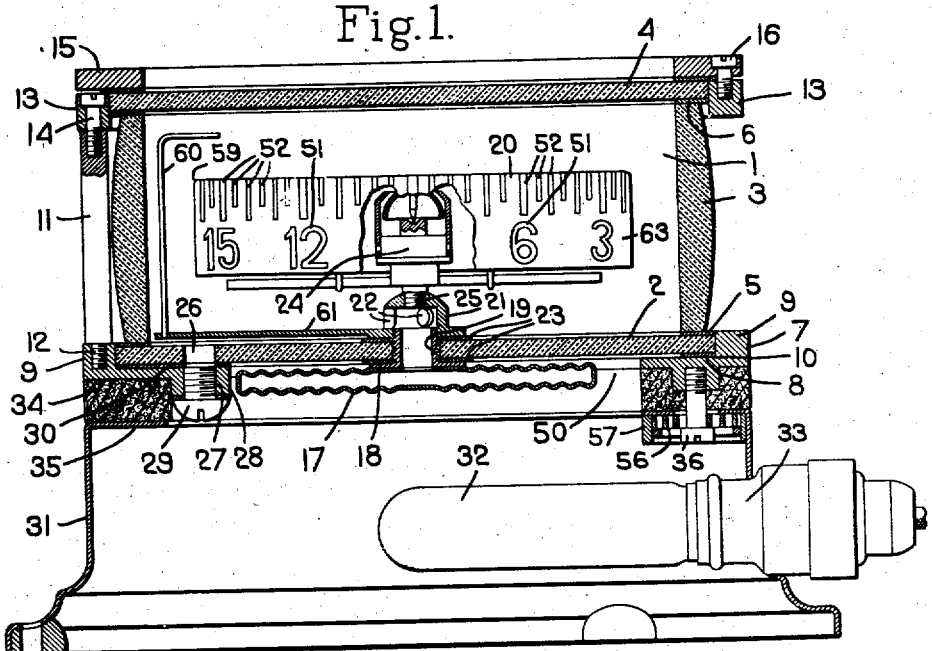
Fig. 1 is a vertical sectional view of a compass embodying my invention.
Figure 2:
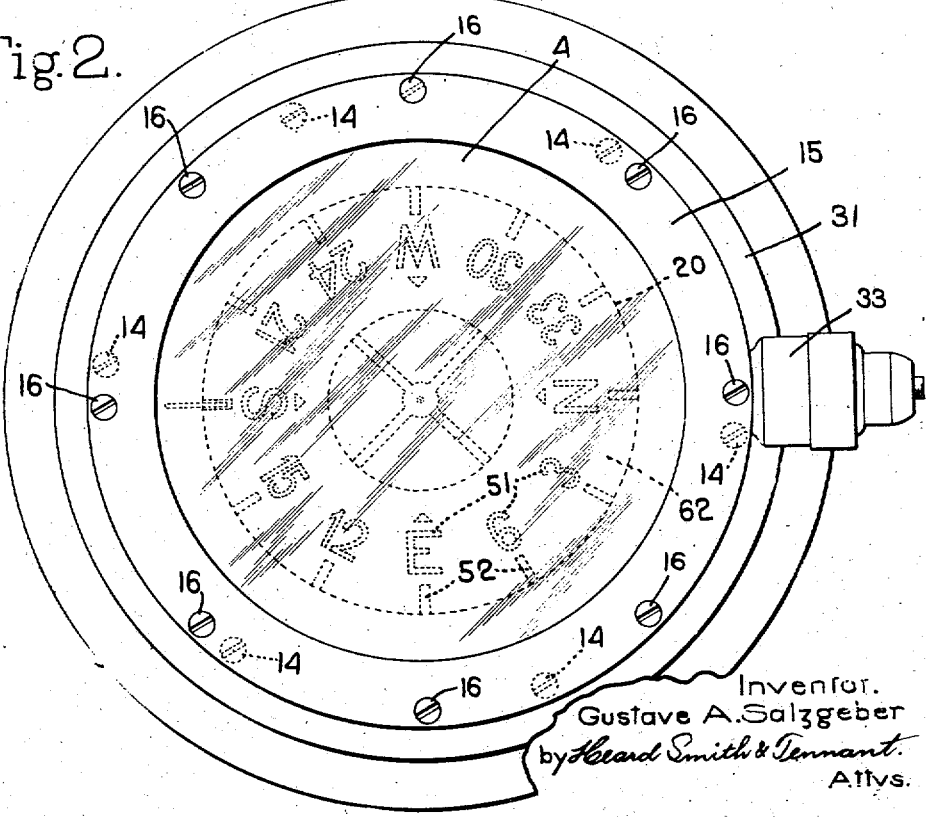
Fig. 2 is a top plan view of Fig. 1.

The compass herein shown is of the type in which the compass bowl is cylindrical in form, it comprising a bottom member, cylindrical side walls of glass resting on the bottom member, a top member, also preferably of glass, resting on the upper edges of the side walls and means to clamp the top and bottom firmly to the side walls.

The compass bowl, is indicated generally at 1 and 20 indicates the compass card which is situated within the bowl, it being understood that the bowl is filled with some suitable liquid as usual in compasses of this type. The compass bowl comprises the bottom member 2, which is preferably of glass or some other transparent or translucent material, the cylindrical side wall member 3 and the top member 4 which may also be of glass or some other transparent material and which rests on the upper edge of the cylindrical side wall member 3. The side wall member 3 may be of glass or other transparent material or it may be opaque depending on whether it is desirable that the compass is to be one which can be read from the side as well as the top.

5 indicates a packing ring or gasket between the lower edge of the cylindrical walls 3 and the bottom 2 and 6 is a similar packing ring or gasket between the upper edge of the cylindrical walls 3 and the top 4.

One feature of the present invention relates to a novel means for clamping the top and bottom firmly to the side walls to make a leak-proof compass bowl.

As herein shown the compass bowl rests on a base member 7 which is in the form of a ring having an annular surface 8 on which the peripheral portion of the bottom 2 rests and having the upstanding curb portion 9 which surrounds the periphery of the bottom 2. 10 indicates a packing ring which is interposed between the glass bottom 2 and the supporting surface 8.

Rising from and secured to the curb 9 are a plurality of posts 11, said posts being screw threaded into the curb as shown at 12. 13 indicates a ring which rests on and is secured to the upper ends of the posts by means of screws 14 that screw into the posts, the heads of the screws being countersunk in the ring 13.

Figure 3:
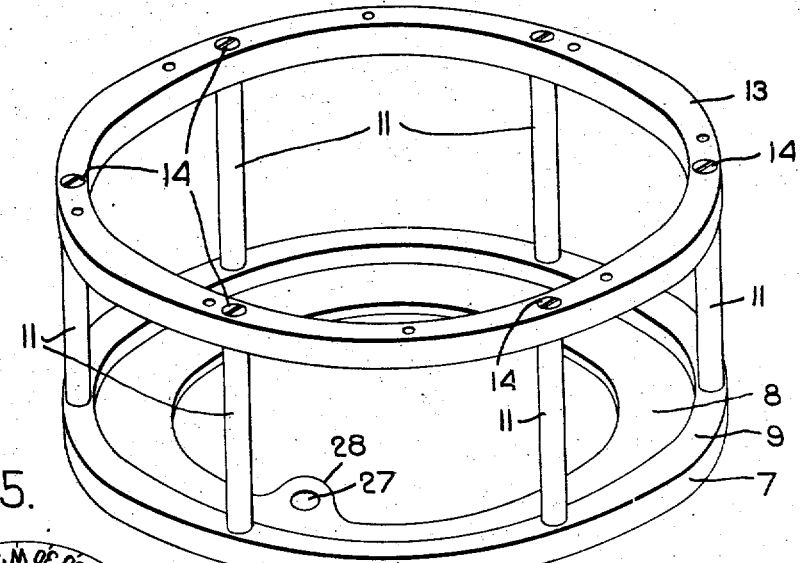
Fig. 3 is a perspective view illustrating the cage within which the compass bowl sits.

The ring 13, the posts 11 and the base member 7 constitute a cage as indicated in Fig. 3 in which the compass bowl is received.

The clamping pressure is applied to the top member 4 for clamping said top member, cylindrical wall 3 and bottom member 2 firmly together through the medium of a clamping ring 15 which overlies the periphery of the top 4 and which is clamped to the ring 13 through the medium of a plurality of clamping screws 16. The clamping screws 16 may be placed at any desired points around the clamping ring 15 and any desired number of clamping screws may be used.

By means of this construction it is possible to apply a clamping pressure to the clamping ring 15 at frequent intervals throughout its extent so that there will be a relatively uniform clamping pressure applied to the periphery of the top 4 throughout the extent thereof. In this way a perfectly tight joint can be readily maintained between the side walls 3 and the top and bottom 4 and 2.

The compass bowl has associated therewith the usual expansion chamber which is indicated at 17 and which is herein shown as situated beneath the bottom 2. This expansion chamber is shown as soldered or otherwise rigidly secured to the flange 18 of a threaded sleeve 19 which extends through the bottom 2 of the compass bowl.

Screw threaded to the upper end of the sleeve 19 is a cap nut 21 which is provided with apertures 22 communicating with the interior of the compass bowl.

23 indicates packing washers, one of which is situated between the flange 18 of the sleeve 19 and the glass bottom and the other of which is situated between the nut 21 and said bottom member 2. These packings serve to make a tight joint around the sleeve. The expansion chamber thus communicates with the interior of the compass bowl through the sleeve 19 and apertures 22.

The cap nut 21 also furnishes a support for the pivot post 24 on which the compass card is pivoted, said post having at its lower end a stem 25 which screw threads into the top of the cap nut.

The bottom 2 is provided with a filling opening 26 which is in alignment with an opening 27 through a lug or ear 28 with which the base ring 7 is provided. The opening 27 is adapted to be closed by a removable plug 29 and a packing ring 10 is formed with an extension 30 situated between the under face of the bottom member 2 and the top face of the ear 28 and provides a tight joint at this place.

The compass bowl is shown as mounted on a hollow base member 31 which may be made of sheet metal or of any suitable material.

The compass bowl may be attached to the base 31 in various ways without departing from the invention. As herein shown said base has an inturned top flange 35 on which rests a ring 34 of felt or some similar resilient material and the compass bowl is supported on this ring. The bowl is attached to the base member through the medium of screws 36 which screw into the base ring 7 and extend through the flange 35. These screws are resiliently connected to the base member 31 through the medium of scroll-shaped springs 56 which surround the heads of the screws, each spring being confined within a circular wall or flange 57 secured to and depending from the flange 35 and which constitutes a spring housing. The connection between the screws 36 and the springs 56 is such as to prevent any relative movement between the compass bowl and its support in a vertical direction or in the general direction of the axis of the compass card while permitting relative lateral movement in any direction, that is, relative movement in any direction transverse to the axis of the compass card. The felt member 34 constitutes a bearing member between the bowl and the base 31.

Situated within the base member 31 is an electric light bulb 32 by which the compass card may be illuminated.

The exterior diameter of the expansion member 17 is less than the interior diameter of the base ring 7 so that there will exist an annular space 50 between this expansion member and the base ring through which light from the source of illumination 32 may pass to illuminate the compass card.

The compass card has markings thereon by which the compass is read and each of the markings is of a substantial width so that the total area of the compass card comprises the portion included within the outlines of the various markings and the portion outside of said outlines. One of said portions is opaque and the other portion is translucent or transparent. In the construction herein illustrated the portion of the area of the card comprised within the outlines of the markings is transparent or translucent while the other portion of the card is opaque. In other words, in the construction shown the area of the compass card confined within the limits of each figure 51 or each graduation marking 52 is translucent. The light from the source of illumination 32 is transmitted through the annular space 50 and the interior of the compass card will thus be illuminated from within. The figures or markings on the compass card which are transparent thus become illuminated so that the compass can be easily read.

The construction herein illustrated presents no obstruction to the passage of the light from the annular opening 50 to the interior of the compass card and thus the card will be properly illuminated without the presence of shadows which will interfere with the reading.

Figure 5:
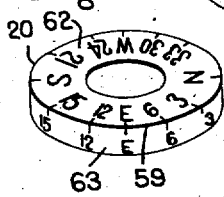
Fig. 5 is a perspective view of the compass card.
Figure 4:
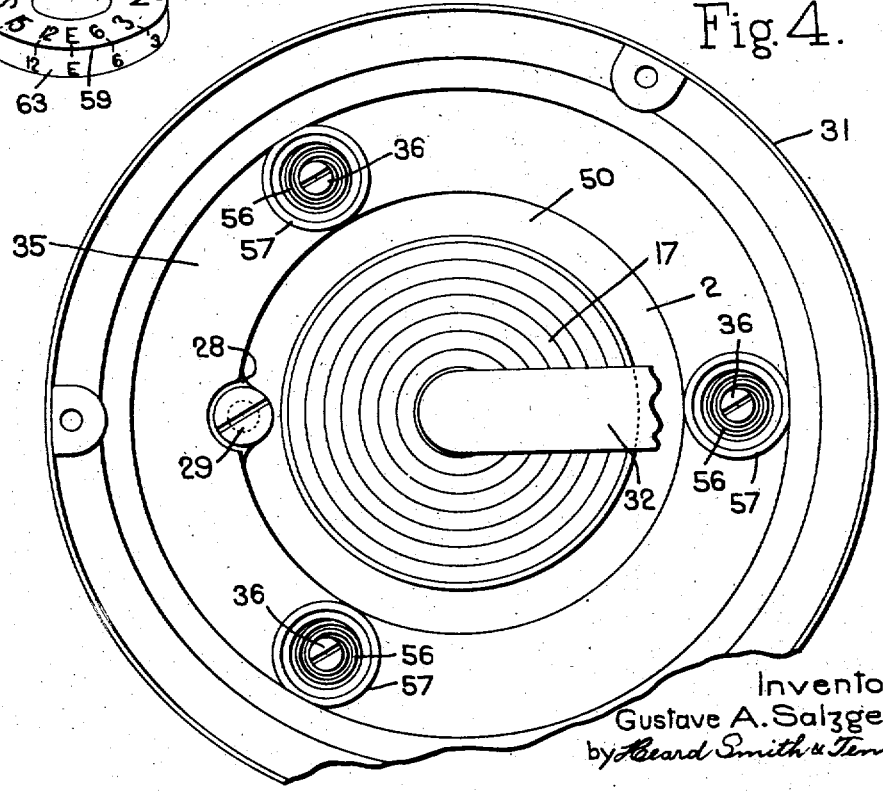
Fig. 4 is an under side view of the compass.

The compass card is herein shown as of that type which is provided with a depending skirt 63 and with markings or graduations on both the top 62 as well as on the skirt 63 so that the compass can be read from either the top or the side. The graduation marks on the top 62 and skirt 63 meet at the corner 59 of the card and these markings on the top and side have the same arrangement and coincide with each other. For instance, the markings on both the top and side of the compass card indicating any given point of the compass card such as "E" or "N" will be at the same part of the compass card or will coincide with each other as clearly seen in Fig. 5.

60 indicates a lubber line which is in the form of a wire and is angular in shape so that it serves both in connection with the markings on the side of the compass card and those on the top thereof. This lubber line wire is shown as secured to and rising from an arm 61 which extends from the cap nut 21.

While I have illustrated herein a selected embodiment of my invention I do not wish to be limited to the constructional features shown.

I claim:

1. A compass comprising a cylindrical compass bowl having a bottom member, cylindrical side walls and a top member, a base ring on which the bottom member rests, posts secured to and rising from said ring, a top ring secured to the top of the posts, a clamping ring engaging the peripheral portion of the top of the compass bowl, and means to clamp the clamping ring, whereby said top, bottom and cylindrical side walls are clamped together to form a closed casing to said top ring.

2. A cylindrical compass comprising a cylindrical side wall member of glass, a top member and a bottom member engaging the ends of the cylindrical side wall member and forming therewith an enclosed chamber, a base ring on which the bottom member rests, posts secured to and rising from said ring, a top ring secured to the top of the posts, a clamping ring engaging the peripheral portion of the top member, means to clamp the clamping ring to the top ring and thereby clamp the top and bottom members to the side wall member, a compass card within said cylindrical side wall member carrying graduations or markings which are readable through said side wall member, said member having a greater thickness at its central portion throughout its extent than at its top and bottom, whereby said side wall member has magnifying properies at all points around its periphery.

3. A compass having a hollow base, a cylindrical compass bowl supported on the base and provided with a bottom made of glass, a threaded sleeve extending through said bottom and having a flange at its lower end provided with a flat under face, an expansion chamber having a corrugated top, the central portion of said top presenting a plane surface which underlies and is secured to the flat face of the flange, a flanged cap nut screw threaded to the upper end of the sleeve within the bowl and having openings which provide communication between the bowl and the expansion chamber, packing rings between the glass bottom and the flanges of both the sleeve and the cap nut, a pivot post separate from the cap nut and screw threaded thereto, and a compass card pivotally mounted on said post.

4. A direct reading cylindrical compass having a sealed cylindrical compass bowl, the bottom, the cylindrical side wall and the top of which are of material through which light is readily transmitted, a compass card within said bowl having a depending peripheral skirt bearing compass graduations, a hollow base on which said bowl is mounted, an expansion chamber secured to the bottom of the bowl at the central portion thereof and communicating with the interior thereof, said expansion chamber being of less diameter than the compass bowl, the annular portion of the bottom outside of the expansion chamber being unobstructed, and a source of illumination within the base by which the skirt portion of the compass card is illuminated through the portion of the bottom outside of the expansion chamber and may be directly read through the cylindrical side walls.

5. A compass having a cylindrical compass bowl provided with a bottom made of glass, a threaded sleeve extending through said bottom and having a flange at its lower end provided with a flat under face, packing means making a tight joint between the flange and the under face of the glass bottom, an expansion chamber, the central portion of the upper face of which underlies and is rigidly secured to said flat face of the flange, said expansion chamber having an opening communicating with the interior of the sleeve, a flanged cap nut screw threaded to the upper end of the sleeve within the bowl and provided with openings by which communication between the bowl and expansion chamber is established, packing means making a tight joint between said flange of the cap nut and the glass bottom, a pivot post separate from the cap nut and screw threaded thereto, and a compass card pivotally mounted on said post.

6. In a compass, the combination with a cylindrical compass bowl having a cylindrical side wall member and a top and bottom, said top and bottom being of transparent material, of a compass card within the bowl having markings of substantial width, whereby the total area of the compass card comprises the portion within the outlines of the markings and the portion outside of said outlines, one of said portions being opaque and the other translucent, a hollow base on which the compass bowl is mounted, as expansion chamber situated beneath the bottom of the compass bowl centrally thereof and communicating therewith, said chamber being smaller than said bottom thereby leaving a portion of the bottom unobstructed, and a source of illumination within the base below the expansion chamber by which the translucent portion of the card is illuminated through said unobstructed portion of the bottom.

7. In a compass, the combination with a cylindrical compass bowl containing liquid and having a cylindrical side wall member of glass which is thicker at its central portion than at the top and bottom, said bowl having a bottom and a top, both of which are of a material through which light is readily transmitted, of a hollow base on which said compass bowl is mounted, a compass card submerged in the liquid in the compass bowl and having compass markings at its peripheral portion, the body of the card being of opaque material and the markings thereon being translucent and a source of illumination within the base by which the peripheral portion of the card and the translucent markings thereon are illuminated from beneath through the bottom of the bowl.

8. In a compass, the combination with a cylindrical compass bowl having a cylindrical side wall member and a top and bottom, said top and bottom and side wall being of translucent material, of a compass card within the bowl having a depending peripheral skirt portion, said compass card having an opaque body portion bearing translucent markings or graduations on the top portion and also on the skirt portion, a hollow base on which the compass bowl is mounted, an expansion chamber situated beneath the bottom of the compass bowl centrally thereof and communicating therewith, and a source of illumination within the base, said expansion chamber being smaller than said bottom whereby the compass card is illuminated from below through the annular zone of the bottom which is outside of the expansion chamber.

9. In a compass, the combination with a cylindrical compass bowl having a cylindrical side wall member and a top and bottom, said top, bottom and side wall being of transparent material, of a compass card within the bowl having a depending peripheral skirt portion, said compass card having a compass markings thereon, each of substantial width, whereby the area of the card is composed of that portion within the outlines of the various markings and the portion outside said outlines, one of said portions being opaque and the other portion being translucent, a hollow base on which the compass bowl is mounted, an expansion chamber situated beneath the bottom of the compass bowl centrally thereof and communicating therewith and a source of illumination within the base, said expansion chamber being smaller than the bottom of the compass bowl whereby the compass card is illuminated from below through the annular zone of the bowl bottom which is outside of the expansion chamber.

10. In a compass, the combination with a cylindrical compass bowl filled with liquid, said bowl having a generally cylindrical side wall member of glass, a top member and a bottom member, said side wall member having a greater thickness at its central portion than at its top and bottom, and having a uniform, radial cross-section corresponding to that of a magnifying lens, whereby it has magnifying properties which are due partly to the cylindrical shape of the side wall and partly to the greater thickness at the center, of means for clamping the top and bottom member to the side wall member and a compass card within said bowl having a skirt portion carrying graduations or markings which are readable through said side wall member, the circular shape of said side wall member together with the vertical cross-sectional shape producing a magnification of the compass markings on the skirt portion which is greater in a horizontal direction than in a vertical direction.

GUSTAVE A. SALZGEBER.

CERTIFICATE OF CORRECTION.

Patent No. 2,018,536.  October 22, 1935.

GUSTAVE A. SALZGEBER.

It is hereby certified that error appears in the printed specification of the above numbered patent requiring correction as follows: Page 2, second column, line 64, strike out the words" to said top ring" and insert the same after "ring" and before the comma, in line 61, of said claim; and that the said Letters Patent should be read with this correction therein that the same may conform to the record of the case in the Patent Office.

Signed and sealed this 26th day of November, A. D. 1935.

Leslie Frazer (Seal)   Acting Commissioner of Patents.

lens, whereby it has magnifying properties which are due partly to the cylindrical shape of the side wall and partly to the greater thickness at the center, of means for clamping the top and bottom member to the side wall member and a compass card within said bowl having a skirt portion carrying graduations or markings which are readable through said side wall member, the circular shape of said side wall member together with the vertical cross-sectional shape producing a magnification of the compass markings on the skirt portion which is greater in a horizontal direction than in a vertical direction.

GUSTAVE A. SALZGEBER.

CERTIFICATE OF CORRECTION.

Patent No. 2,018,536.                                             October 22, 1935.

GUSTAVE A. SALZGEBER.

It is hereby certified that error appears in the printed specification of the above numbered patent requiring correction as follows: Page 2, second column, line 64, strike out the words" to said top ring" and insert the same after "ring" and before the comma, in line 61, of said claim; and that the said Letters Patent should be read with this correction therein that the same may conform to the record of the case in the Patent Office.

Signed and sealed this 26th day of November, A. D. 1935.

Leslie Frazer (Seal)                                                Acting Commissioner of Patents.